US005554709A

United States Patent [19]

Emmerling et al.

[11] Patent Number: 5,554,709

[45] Date of Patent: Sep. 10, 1996

[54] MOISTURE-CURING ALKOXYSILANE-TERMINATED POLYURETHANES

[75] Inventors: Winfried Emmerling, Neuss; Tore Podola, Monheim; Lothar Unger, Erkrath; Martin Majolo, Erkelenz, all of Germany

[73] Assignee: Henkel Kommanditgesellschaft auf Aktien, Duesseldorf, Germany

[21] Appl. No.: 436,504

[22] Filed: May 8, 1995

Related U.S. Application Data

[63] Continuation of Ser. No. 315,307, Sep. 29, 1994, abandoned, which is a continuation of Ser. No. 179,897, Jan. 10, 1994, abandoned, which is a continuation of Ser. No. 30,140, filed as PCT/EP91/01712 Sep. 9, 1991 published as WO92/05212 Apr. 2, 1992, abandoned.

[30] Foreign Application Priority Data

Sep. 18, 1990 [DE] Germany .......................... 40 29 505.2

[51] Int. Cl.[6] .......................... C08G 18/10; C08G 18/28; C08G 18/83

[52] U.S. Cl. ................................ 528/27; 528/28; 528/29; 528/30; 528/38; 525/452; 525/453; 525/460

[58] Field of Search ................................ 528/27, 28, 29, 528/30, 38; 525/452, 453, 460

[56] References Cited

U.S. PATENT DOCUMENTS

| | | | |
|---|---|---|---|
| 3,627,722 | 12/1971 | Seiter | 260/37 |
| 4,798,878 | 1/1989 | Brinkmann et al. | 528/28 |
| 4,857,623 | 8/1989 | Emmerling et al. | 528/28 |

FOREIGN PATENT DOCUMENTS

| | | |
|---|---|---|
| 0170865 | 2/1986 | European Pat. Off. . |
| 0261409 | 3/1988 | European Pat. Off. . |
| 0371370 | 6/1990 | European Pat. Off. . |
| 1140301 | 6/1957 | France . |
| 1189988 | 10/1959 | France . |
| 1217009 | 4/1960 | France . |
| 1254063 | 1/1961 | France . |
| 3629237 | 3/1988 | Germany . |
| 2738979 | 6/1989 | Germany . |

OTHER PUBLICATIONS

Plueddemann, Edwin P.: "Chemistry of Silane Coupling Agents", *Plenum Press*, New York (1982), pp. 29–45.

*Primary Examiner*—Frederick Krass

*Attorney, Agent, or Firm*—Wayne C. Jaeschke; John Daniel Wood; Daniel S. Ortiz

[57] ABSTRACT

Described are moisture-curing alkoxysilane-terminated polyurethanes which can be obtained by reacting polyurethane prepolymers with a mean NCO functionality of at least 1 but less than 2 with special sulfur-free alkoxysilanes, reacting with substantially all the free NCO groups. Also described is the use of these compounds as sealing and/or adhesive compositions.

20 Claims, No Drawings

MOISTURE-CURING ALKOXYSILANE-TERMINATED POLYURETHANES

This application is a continuation of application Ser. No. 08/315,307, filed on 29 Sep. 1994, now abandoned, which is a continuation of application Ser. No. 08/179,897, filed on 10 Jan. 1994, now abandoned, which is a contination of application Ser. No. 08/030,140, filed on 18 Mar. 1993, now abandoned.

FIELD OF THE INVENTION

This invention relates to moisture-curing, alkoxysilane-terminated polyurethanes and to their use in adhesives and sealing compositions.

Statement of Related Art

Alkoxysilane-terminated moisture-curing one-component polyurethanes are being used to an increasing extent as soft-elastic coating, sealing and adhesive compositions in the building industry and in the automotive industry. In applications such as these, elasticity, adhesive power and cure rate have to meet stringent requirements. A process for the production of crosslinkable alkoxysilane-terminated polyurethane prepolymers is known from DE-OS 27 38 979. These prepolymers cure under the influence of moisture at room temperature to form elastic products combining favorable mechanical properties with good adhesion. However, these products are attended by the disadvantage that their cure rate, particularly in the layer thicknesses mainly encountered in practice, is unsatisfactory. In addition, they show slow skin formation so that the surfaces remain tacky for a long time and soil particles can be deposited thereon so that both their mechanical properties and their external appearance are adversely affected.

EP 170 865 describes a process for the production of soft-elastic synthetic resins based on NCO-functional polyurethane prepolymers and alkoxysilanes which are stable in storage in the absence of moisture. In this process, the NCO-terminated polyurethanes are reacted first with alkoxysilanes containing ethoxy groups and then optionally with typical chain-extending agents or chain terminators. Although the alkoxysilane-terminated polyurethanes produced by this process show rapid skin formation and fast cure rates, the stability in storage of the uncured compositions is in need of improvement for practical purposes.

DE-OS 36 29 237 describes alkoxysilane-terminated moisture-curing polyurethanes obtainable by reaction of NCO-terminated polyurethane prepolymers having an NCO functionality of at least 1 and less than 2 and aminoalkyl, mercaptoalkyl or epoxyalkyl alkoxysilanes containing polyethoxy units. However, these products—like those according to EP 170 865—tend to be unstable in storage, above all when, through frequent use, atmospheric moisture reaches the composition remaining, for example, in the tube. Finally, one of the Examples of DE-OS 36 29 237 describes the reaction of an NCO-terminated polyurethane prepolymer having a theoretical NCO content of 0.76% and mercaptopropyl trimethoxysilane. However, the mercaptopropyl trimethoxysilane-terminated polyurethanes obtained have the disadvantage that they suffer a loss of reactivity after prolonged storage which is reflected in delayed skin formation and curing.

DESCRIPTION OF THE INVENTION

Object of the Invention

Accordingly, the problem addressed by the present invention was to develop moisture-curing alkoxysilane-terminated polyurethanes which would overcome the disadvantages of the prior art.

SUMMARY OF THE INVENTION

According to the invention, this problem has been solved by moisture-curing alkoxysilane-terminated polyurethanes obtainable by preparing polyurethane prepolymers having an average NCO functionality of at least 1 and less than 2 in a first step by a) reaction of OH-terminated polyols with diisocyanates to form NCO-terminated polyurethane prepolymers having an average NCO functionality of at least 2 and subsequent partial reaction of the remaining NCO groups with monoalkyl polyether alcohols and/or with linear or branched aliphatic monofunctional alcohols containing 1 to 18 carbon atoms or a') reaction of OH-terminated polyols with a mixture of mono- and di-isocyanates and reaction of substantially all the free NCO groups in the polyurethane prepolymers obtained in a) and/or a') with alkoxysilanes in a second process step, characterized in that the alkoxysilanes correspond to the following general formula:

$$X-(CH_2)_n-\underset{\displaystyle R}{\underset{|}{Si}}-(OR^1)_2$$

in which

X=

$$NHR^2,\ R^2-\underset{\diagdown O \diagup}{CH-CH}-CH_2-O$$

and/or $(NH—CH_2—CH_2)_m—NHR^2$

R=—$CH_3$, —$CH_2CH_3$ and/or $OR^1$ $R^1$=an optionally substituted aliphatic, cycloaliphatic and/or aromatic hydrocarbon radical containing 1 to 10 carbon atoms $R^2$=H and/or an optionally substituted aliphatic, cycloaliphatic and/or aromatic hydrocarbon radical containing 1 to 10 carbon atoms n=2 to 6 m=1 or 2.

DESCRIPTION OF PREFERRED EMBODIMENTS

The NCO-terminated polyurethane prepolymers resulting as intermediate product are obtained using OH-terminated polyols. Polyols suitable for the purposes of the invention are polyols from the group consisting of polyether polyols, polyester polyols, polyalkylene diols and/or polyacetals containing 2 or more free OH groups. The polyols mentioned and their production are known from the prior art. For example, polyester polyols can be obtained by reaction of dicarboxylic acids with triols or with an excess of diols and/or triols and by ring opening of epoxidized (fatty) esters with alcohols. Polycaprolactone diols obtainable from ϵ-caprolactone and diols are also suitable as polyester polyols.

According to the invention, polyester polyols are preferably obtained by reaction of low molecular weight dicarboxylic acids, such as adipic acid, isophthalic acid, terephthalic acid and phthalic acid, with an excess of diols containing 2 to 12 carbon atoms, trimethylol propane and/or glycerol. Polycondensation products of formaldehyde and diols and/or polyols in the presence of acidic catalysts are mentioned as examples of polyacetals. Polyalkylene diols, such as polybutadiene diol for example, are commercial products obtainable in various molecular weights. Polyether polyols may be obtained, for example, by copolymerization or block polymerization of alkylene oxides, such as ethylene oxide, propylene oxide and butylene oxide, or by reaction of polyalkylene glycols with difunctional or trifunctional alcohols. However, the polymerized ring opening products of tetrahydrofuran with alcohols are also suitable as polyether polyols. One preferred embodiment of the invention is characterized by the use of alkoxylation products, more particularly ethoxylation and/or propoxylation products, of difunctional or trifunctional alcohols selected from the group consisting of ethylene glycol, diethylene glycol, triethylene glycol, propane-1,2-diol, dipropylene glycol, the butane diols, hexane diols, octane diols, technical mixtures of hydroxyfatty alcohols containing 14 to 22 carbon atoms, more particularly hydroxystearyl alcohol, trimethylol propane and glycerol. The alkoxysilane-terminated polyurethane can be given a more hydrophobic or hydrophilic character through the choice of suitable alcohols. Thus, a predominantly hydrophobic molecule can be obtained by predominant addition of propylene oxide onto polyfunctional alcohols whereas relatively hydrophilic molecules are obtained with ethylene oxide or rather where alkoxylation is carried out solely with ethylene oxide. In addition, the viscosity of the polyurethane prepolymer and hence its processability can be influenced through the choice of the alcohols.

Comparatively low viscosity values and hence excellent processability are achieved where linear OH-terminated diols, particularly poly{propylene glycols}, are used. Polyols having an average molecular weight in the range from 300 to 6000 and preferably in the range from 500 to 4000 are preferred for the purposes of the invention, linear diols having molecular weights in those ranges being particularly preferred. Poly{propylene glycols} having an average molecular weight in the range from 500 to 4000 are most particularly preferred; mixtures of poly{propylene glycols} differing in their molecular weight may of course also be used. To obtain sufficiently high strength values for practical purposes after curing of the alkoxysilane-terminated polyurethane, the percentage content of high molecular weight poly[propylene glycol} should be limited. Mixtures of poly{propylene glycols} differing in their molecular weights preferably contain less than 75% by weight, based on polyol mixture, of poly{propylene glycol} with molecular weights above 4000. On the other hand, the poly{propylene glycols} may be mixed with one or more of the polyols mentioned, preferably with linear diols. However, a high percentage content of poly{propylene glycol}, preferably in excess of 75% by weight, based on polyol mixture, is preferred for soft and elastic compositions.

The above-mentioned hydroxyfunctional polyols are converted into NCO-terminated polyurethane prepolymers in known manner by reaction with isocyanates. In one embodiment of the present invention, the OH-terminated polyols are reacted with diisocyanates to form NCO-terminated polyurethane prepolymers having an average NCO functionality of at least 2. Suitable diisocyanates are aromatic diisocyanates, such as 2,4- and 2,6-tolylene diisocyanate, 1,5-naphthalene diisocyanate, 4,4-diphenylmethane diisocyanate, 3,3-dimethoxy-4,4-diphenylisocyanate and/or xylylene diisocyanates. Suitable aliphatic diisocyanates are, in particular, 1,4-tetramethylene diisocyanate, 1,6-hexamethylene diisocyanate, decane-1,10-diisocyanate, 2,2,4-trimethyl hexamethylene diisocyanate, dicyclohexyl methane diisocyanate, tetramethylene xylylene diisocyanates, isophorone diisocyanate and/or the technical isocyanates obtainable by phosgenation from the amines formed in the hydrogenation of dimer fatty acid nitriles. Aliphatic diisocyanates, more particularly trimethyl hexamethylene diisocyanate, are recommended for applications in which the alkoxysilane-terminated polyurethanes are intended to replace silicones.

The polyurethane prepolymers obtained in this embodiment which have an average NCO functionality of at least 2 are subsequently reacted with linear or branched aliphatic monofunctional alcohols containing 1 to 18 carbon atoms and/or monoalkyl polyether alcohols to form a polyurethane prepolymer having an average NCO functionality of at least 1 and less than 2. Suitable linear or branched aliphatic monofunctional alcohols are, in particular, methanol, ethanol, isomers of propanol, butanol and/or hexanol and also $C_{8-18}$ fatty alcohols, such as octanol, decanol, dodecanol, tetradecanol, hexadecanol and/or octadecanol. The fatty alcohols may be obtained, for example, by reduction of natural fatty acids and may be used both in pure form and in the form of technical mixtures. Linear monoalcohols, particularly $C_{4-8}$ linear monoalcohols, are preferred because the lower alcohols are difficult to produce in anhydrous form. Monoalkyl polyether alcohols differing in their molecular weight, preferably over the range from 1000 to 2000, may be used instead of or in admixture with the linear or branched aliphatic alcohols. Monobutyl propylene glycol is preferred, being used either on its own or in admixture with aliphatic linear alcohols containing 4 to 18 carbon atoms.

In another embodiment of the invention, the OH-terminated polyols are reacted with a mixture of mono- and diisocyanates to form NCO-terminated polyurethane prepolymers having an average NCO functionality of at least 1 and less than 2. In addition to the diisocyanates described above, the mixtures contain mixtures of monoisocyanates, preferably aromatic monoisocyanates, such as phenyl isocyanate, tolyl isocyanate and/or naphthylene isocyanate. In both embodiments, the polyurethane prepolymers obtained as intermediate products have an NCO functionality of at least 1 and less than 2. The lower the NCO functionality of the NCO-terminated polyurethane prepolymers, the softer the cured silanized end products will be. Accordingly, the number average NCO functionality of the NCO-terminated polyurethane prepolymers is best between 1.2 and 1.8.

In a second process step, the NCO-terminated polyurethane prepolymers obtained in both embodiments are reacted with alkoxysilanes corresponding to the following general formula:

$$X-(CH_2)_n-\underset{\displaystyle R}{\underset{|}{Si}}-(OR^1)_2$$

in which

X=

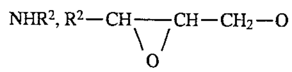

and/or $(NH—CH_2—CH_2)_m—NHR^2$

R=$—CH_3$, $—CH_2CH_3$ and/or $OR^1$ $R^1$=an optionally substituted aliphatic, cycloaliphatic and/or aromatic hydrocarbon radical containing 1 to 10 carbon atoms $R^2$=H and/or an optionally substituted aliphatic, cycloaliphatic and/or aromatic hydrocarbon radical containing 1 to 10 carbon atoms n=2 to 6 m=1 or 2.

The alkoxysilanes corresponding to the above formula are products known per se. Thus, the production of the monoalkyl alkoxysilanes and the N-(aminoalkyl)-aminoalkyl alkoxysilanes is described in French patents 11 40 301, 11 89 988, 12 17 009 and 12 54 063 and in the book by Plueddemann entitled Silane Coupling Agents (Plenum Press, New York, 1982), pages 29 to 45. In general, amino-organofunctional alkoxysilanes are obtained by reaction of haloalkyl alkoxysilanes with ammonia or amines or by hydrogenation of cyanoalkyl alkoxysilanes.

Epoxyalkyl alkoxysilanes are also described in Plueddemann's book and may be obtained, for example, by addition of alkoxysilanes onto unsaturated epoxides or by epoxidation of alkylene alkoxysilanes. According to the invention, the same or different aminoalkyl alkoxysilanes, N-(aminoalkyl)-aminoalkyl alkoxysilanes and/or epoxyalkyl alkoxysilanes may be reacted, although alkoxysilanes in which X is the $NHR^2$ group and $R^2$ is H, i.e. the group or aminoalkyl alkoxysilanes, are preferred. Of the aminoalkyl alkoxysilanes, (β-aminoethyl)-trimethoxysilane, (γ-aminopropyl)-trimethoxysilane, (β-aminoethyl)-methyl dimethoxysilane, (γ-aminopropyl)-methyl dimethoxysilane, (β-aminomethyl)-trimethoxysilane, (γ-aminopropyl)-triethoxysilane, (β-aminoethyl)-methyl diethoxysilane and/or (γ-aminopropyl)-methyl diethoxysilane are particularly suitable. The reactivities of the alkoxysilane-terminated polyurethanes can be controlled through the nature of the substituents R and $R^1$. Particularly good reactivities are obtained when R has the meaning $OR^1$, i.e. in the case of aminofunctional trialkoxysilanes. In addition, the reactivity can be further controlled through the alkoxy group. Thus, the preferred aminoalkoxysilanes can be cured much more quickly when the substituent $R^1$ is an aliphatic short-chain hydrocarbon radical. Accordingly, (β-aminoethyl)-trimethoxysilane and/or (γ-aminopropyl)-trimethoxysilane are most particularly preferred.

In a less preferred embodiment of the present invention, other alkoxysilanes containing isocyanate-reactive groups than the alkoxysilanes corresponding to the general formula may also be reacted with the polyurethane prepolymers. Thus, the amino-ophenyl alkoxysilanes, carboxy- and/or hydroxy-modified alkoxysilanes mentioned in Plueddmann's book may be used either individually or in admixture with the alkoxysilanes corresponding to the general formula.

The reaction of the NCO-terminated polyurethane prepolymers with the alkoxysilanes corresponding to the above formula is preferably carried out in the presence of catalysts, for example the catalysts known from U.S. Pat. No. 3,627,722. Tin and/or titanium compounds, particularly dibutyl tin dilaurate, are preferably used as catalysts.

The present invention also relates to the use of the moisture-curing alkoxysilane-terminated polyurethanes as sealing or adhesive compositions. For practical application, the moisture-curing alkoxysilane-terminated polyurethanes may contain typical additives, such as pigments, fillers, curing catalysts, dyes, plasticizers, thickeners, coupling agents, extenders and UV stabilizers. Suitable fillers are isocyanate-inert inorganic compounds such as, for example, chalk, lime flour, precipitated and/or pyrogenic silica, aluminum silicates, ground minerals and other inorganic fillers familiar to one skilled in the art. In addition, organic fillers, particularly short-staple fibers and the like, may also be used. Fillers which provide the preparations with thixotropic properties, for example swellable polymers, are preferred for certain applications. The typical additives mentioned may be used in the quantities familiar to the expert.

Curing may be accelerated by the addition of organic or inorganic compounds, such as for example dibutyl tin diacetate, dibutyl tin dilaurate and/or tetrabutyl dioleatodistannoxane, in small quantities as catalysts. In addition to the curing catalysts, small quantities of amines, such as (β-aminoethylaminopropyl)-trimethoxysilane and/or lauryl amine, may also be added to accelerate curing. The cure rate may be varied within wide limits according to the particular application through the quantity of curing catalysts and, optionally, amines added.

EXAMPLES

Example 1

In a heatable stirred tank reactor, 1000 parts (=1 equivalent) of poly{propylene glycol} having an average molecular weight of 2000 and 130.5 parts (=1.5 equivalents) of tolylene diisocyanate (TDI) were reacted with stirring under nitrogen with 0.33 part of dibutyl tin dilaurate (DBTL) at a temperature of 90° C. The theoretical NCO content of 1.88% was reached after about 4.5 hours. 147 parts of poly{propylene glycol} monobutyl ether (MW 735) (≧0.2 equivalent) were then added and the mixture was stirred for 6 hours to a theoretical NCO content of 1.0%. The mixture was then cooled to 60° C. and 53.7 parts (=0.3 equivalent) of aminopropyl trimethoxysilane were added slowly enough that an internal temperature of 80° C. was not exceeded. The reaction mixture was then stirred for approximately 30 minutes. The free NCO content of the alkoxysilane-terminated polyurethane is below 0.03%. The product has a Brookfield viscosity of 80,000 mP.s at 25° C.

Example 2

In a heatable stirred reactor, 500 parts (=0.5 equivalent) of poly{propylene glycol} having an average molecular weight of 2000, 1000 parts (=0.5 equivalent) of poly{propylene glycol} having an average molecular weight of 4000 and 136.5 parts (≧1.3 equivalents) of trimethyl hexamethylene diisocyanate (TMDI) were reacted with stirring under nitrogen with 0.83 part of dibutyl tin dilaurate at a temperature of 100° C. The theoretical NCO content of 0.76% was reached after about 5 hours. 73.5 Parts (=0.1 equivalent) of poly{propylene glycol} monobutyl ether (MW=735) were then added and the mixture was stirred for 2 hours to a theoretical NCO content of 0.5 %. As in Example 1, the mixture was cooled to 60° C. and, after the addition of 35.8 parts (0.2 equivalent) of aminopropyl trimethoxysilane, was stirred for another 30 minutes. The free NCO content of the alkoxysilane-terminated polyurethane is below 0.03%. The product has a Brookfield viscosity of 80,000 mP.s at 25° C.

Example 3

As in Example 1, 1000 parts (=1 equivalent) of poly{propylene glycol} having an average molecular weight of 2000 and 134.4 parts of trimethyl hexamethylene diisocyanate (=1.28 equivalents) were reacted with stirring with 0.6 part of dibutyl tin dilaurate at 90° C. in a heatable stirred tank reactor. The theoretical NCO content of 1.04 % was reached after about 4 hours. 102.9 Parts (≧0.14 equivalent) of poly{propylene glycol} monobutyl ether (MW 735) were then added and the mixture was stirred for 2 hours at 90° C. to a theoretical NCO content of 0.5%. The mixture was then cooled to 65° C. and 25.1 parts (=0.14 equivalent) of aminopropyl trimethoxysilane were added slowly enough that the temperature of 80° C. was not exceeded. The mixture was then stirred for about 30 minutes. The NCO content measured thereafter was below 0.03%. The product has a Brookfield viscosity of 150,000 mP.s at 25° C.

Comparison Example 1

In a heatable stirred tank reactor, 1000 parts of poly{propylene glycol} (=1 equivalent) having an average molecular weight of 2000 and 134.4 parts of trimethyl hexamethylene diisocyanate (=1.28 equivalents) were reacted with stirring under nitrogen with 0.6 part of dibutyl tin dilaurate at a temperature of 90° C. The theoretical NCO content of 1.4 % was reached after about 4 hours. 102.9 Parts of (≧0.14 equivalent) poly{propylene glycol} monobutyl ether (MW 735) were then added and the mixture was stirred for 2 hours at 90° C. to a theoretical NCO content of 0.5%. 27.4 parts of mercaptopropyl trimethoxysilane (=0.14 equivalent) and 0.2 part of dibutyl tin dilaurate were then added and the mixture was stirred for 9 hours at 90° C. The NCO content measured thereafter is below 0.1%. The product has a Brookfield viscosity of 90,000 mP.s at 25° C.

Comparison Example 2

Following the procedure described in Example 1, the same polyurethane prepolymer was prepared from polypropylene glycol, tolylene diisocyanate and poly(propylene glycol} monobutyl ether. In contrast to Example 1, 133 parts (=0.3 equivalent) of tris-2-(2-methoxyethoxy)-ethoxy)-silyl-3-aminopropane {formula: $H_2N—CH_2—CH_2—CH_2—Si—[O(—CH_2—CH_2—O)_2CH_3]_3$} instead of aminopropyl trimethoxysilane were added slowly enough that a temperature of 80° C. was not exceeded. The mixture was then stirred for 30 minutes. The NCO content measured thereafter was below 0.03%. The product had a Brookfield viscosity of 60,000 mPa.s at 25° C.

Example 4

Jointing compositions were produced from the alkoxysilane-terminated polyurethanes of Example 3 and Comparison Example 1. To this end, 29 parts by weight of the particular alkoxysilane-terminated polyurethane were stirred with 16 parts of a commercially available plasticizer (Santicizer-261®, a product of Monsanto: phthalic acid octyl benzyl ester) and 3 parts of vinyl trimethoxysilane and also 2.1 parts of xylene at room temperature in a vacuum planetary dissolver. 42 parts of chalk, 6 parts of titanium dioxide, 0.3 part of benztriazole (UV absorber): and 0.3 part of an antioxidant (Tinuvin-765) were then added to the mixture, followed by stirring in vacuo (25 mbar) at 2000 to 3000 r.p.m. until a smooth homogeneous paste was formed. The paste was then stirred in vacuo with 0.2 part of 1-dodecyl amine, 1 part of aminotrimethoxysilane (drying agent) and 0.1 part of dibutyl din dilaurate as curing catalyst mixture and packed in a cartridge. The two joint sealing compositions were tested for their skin forming time immediately after preparation and after 10 months and also for surface tackiness. The skin forming time was determined by a sensitive test in which the joint sealing composition is sprayed on in the form of a strand (diameter 1 cm, length 15 cm). During curing, the joint sealing composition was stored in a conditioned room atmosphere (23° C., 50 % relative air humidity). Surface tack was also determined by a sensitive test. The comparative results are set out in Table 1 and show very clearly that the mercaptopropyl trimethoxysilane-terminated polyurethanes suffer a loss of reactivity after storage.

TABLE 1

| | Mercaptoalkyl alkoxysilane-terminated PUR in joint sealing composition | Aminoalkyl alkoxysilane-terminated PUR in joint sealing composition |
|---|---|---|
| Skin formation | | |
| Immediately after preparation | 2 hours | 25 minutes |
| After 10 months | 4 hours | 25 minutes |
| Tack-free time | | |
| Immediately after preparation | 4 hours | 30 minutes |
| After 10 months | 25 hours | 30 minutes |

Example 5

Sealing compositions were produced from the alkoxysilane-terminated polyurethanes of Example 1 and Comparison Example 2. To this end, 350 parts of the particular alkoxysilane-terminated polyurethane were mixed in vacuo for 15 minutes with 39 parts of a hydrophobicized silica (Aerosil® R 974, a product of Degussa) in a planetary compounder. 0.4 part of dibutyl tin diacetate were then added, followed by mixing for 10 minutes.

To test stability in storage, the compositions stored in a sealed container were tested for their increase in viscosity after various times (Brookfield at 25° C.). The initial viscosities and the viscosities of the sealing compositions after various periods are shown in Table 2. It can clearly be seen that the compositions based on Comparison Example 2 have higher viscosities, i.e. they are not stable in storage over a prolonged period.

TABLE 2

| | Sealing compositions | | |
|---|---|---|---|
| | Initial viscosity of the sealing composition | Viscosity after 1 week | Viscosity after 3 weeks |
| Based on Ex. 1 | 450,000 | 460,000 | 500,000 |
| Based on Comp. Ex. 2 | 700,000 | 1,100,000 | 2,000,000 |

The invention claimed is:

1. Moisture-curing alkoxysilane-terminated polyurethanes obtained by preparing polyurethane prepolymers having an average NCO functionality of at least 1 and less than 2 in a first step by a) reaction of OH-terminated polyols with diisocyanates to form NCO-terminated polyurethane prepolymers having an average NCO functionality of at least 2 and subsequent partial reaction of the remaining NCO groups with monoalkyl polyether alcohols, with linear or branched aliphatic monofunctional alcohols containing 1 to 18 carbon atoms, or with both monoalkyl polyether alcohols and linear or branched aliphatic monofunctional alcohols or by a') reaction of OH-terminated polyols with a mixture of mono- and diisocyanates and, in a second step, reaction of substantially all the free NCO groups in the polyurethane prepolymers obtained in a), a'), or both with alkoxysilanes corresponding to the following general formula:

$$X-(CH_2)_n-\underset{\displaystyle R}{\underset{|}{Si}}-(OR^1)_2$$

in which $X=NHR^2$, or $(NH-CH_2-CH_2)_m-NHR^2$ $R=-CH_3$, $-CH_2CH_3$ or $OR^1$ $R^1$=an aliphatic, cycloaliphatic and/or aromatic hydrocarbon radical containing 1 to 10 carbon atoms $R^2$=H and/or an aliphatic, cycloaliphatic and/or aromatic hydrocarbon radical containing 1 to 10 carbon atoms n=2 to 6 m=1 or 2.

2. Alkoxysilane-terminated polyurethanes as claimed in claim 1, that are obtained using alkoxysilanes corresponding to the following general formula $$X-(CH_2)_n-\underset{\displaystyle R}{\underset{|}{Si}}-(OR^1)_2$$

where $X=NHR^2$ and $R^2=H$.

3. Alkoxysilane-terminated polyurethanes as claimed in claim 2, that are obtained using alkoxysilanes selected from the group consisting of (β-aminoethyl)-trimethoxysilane, (γaminopropyl)-trimethoxysilane, (γ-aminoethyl)-methyl dimethoxysilane, (γ-aminopropyl)-methyl dimethoxysilane, (γ-aminomethyl)triethoxysilane, (γ-aminopropyl)-triethoxysilane, (γ-aminoethyl)-methyl diethoxysilane and (γ-aminopropyl)-methyl diethoxysilane optionally in admixture with other aminosilanes of the claimed formula.

4. Alkoxysilane-terminated polyurethanes as claimed in claim 3, wherein the polyurethane prepolymers are produced using polyols having a molecular weight of 300 to 6000.

5. Alkoxysilane-terminated polyurethanes as claimed in claim 4, wherein the polyurethane prepolymers are produced using polypropylene glycols, optionally in admixture with one or more of polyether polyols, polyester polyols, polyacetals or polyalkylene diols.

6. Alkoxysilane-terminated polyurethanes as claimed in claim 5, wherein the polyurethane prepolymers having an average NCO functionality of at least 2 are reacted with aliphatic monofunctional alcohols, monoalkyl polyether alcohols, or both having a molecular weight of 1000 to 2000.

7. Alkoxysilane-terminated polyurethanes as claimed in claim 6, wherein the average NCO functionality of the NCO-terminated polyurethane prepolymers is between 1.2 and 1.8.

8. Sealing or adhesive compositions comprising moisture-curing alkoxysilane-terminated polyurethanes as claimed in claim 1 optionally together with additives selected from the group consisting of pigments, fillers, UV stabilizers, curing catalysts and curing accelerators.

9. Alkoxysilane-terminated polyurethanes as claimed in claim 1 that are obtained using alkoxysilanes selected from the group consisting of (β-aminoethyl)trimethoxysilane, (γ-aminopropyl)-trimethoxysilane, (β-aminoethyl)-methyl dimethoxysilane, (γ-aminopropyl)-methyl dimethoxysilane, (β-aminomethyl)-triethoxysilane, (γ-aminopropyl)-triethoxysilane, (β-aminoethyl)-methyl diethoxysilane and (γ-aminopropyl)methyl diethoxysilane.

10. Alkoxysilane-terminated polyurethanes as claimed in claim 1, wherein the polyurethane prepolymers are produced using polyols having a molecular weight of 300 to 6000.

11. Alkoxysilane-terminated polyurethanes as claimed in claim 3, wherein the polyurethane prepolymers are produced using polypropylene glycols, optionally in admixture with one or more of polyether polyols, polyester polyols, polyacetals or polyalkylene diols.

12. Alkoxysilane-terminated polyurethanes as claimed in claim 1, wherein the polyurethane prepolymers are produced using linear diols, optionally in admixture with one or more of polyether polyols, polyester polyols, polyacetals and polyalkylene diols.

13. Alkoxysilane-terminated polyurethanes as claimed in claim 1, wherein the polyurethane prepolymers having an average NCO functionality of at least 2 are reacted with aliphatic monofunctional alcohols, monoalkyl polyether alcohols, or both having a molecular weight of 1000 to 2000.

14. Alkoxysilane-terminated polyurethanes as claimed in claim 13, wherein the average NCO functionality of the NCO-terminated polyurethane prepolymers is between 1.2 and 1.8.

15. Alkoxysilane-terminated polyurethanes as claimed in claim 11, wherein the average NCO functionality of the NCO-terminated polyurethane prepolymers is between 1.2 and 1.8.

16. Alkoxysilane-terminated polyurethanes as claimed in claim 5, wherein the average NCO functionality of the NCO-terminated polyurethane prepolymers is between 1.2 and 1.8.

17. Alkoxysilane-terminated polyurethanes as claimed in claim 4, wherein the average NCO functionality of the NCO-terminated polyurethane prepolymers is between 1.2 and 1.8.

18. Alkoxysilane-terminated polyurethanes as claimed in claim 3, wherein the average NCO functionality of the NCO-terminated polyurethane prepolymers is between 1.2 and 1.8.

19. Alkoxysilane-terminated polyurethanes as claimed in claim 2, wherein the average NCO functionality of the NCO-terminated polyurethane prepolymers is between 1.2 and 1.8.

20. Alkoxysilane-terminated polyurethanes as claimed in claim 1, wherein the average NCO functionality of the NCO-terminated polyurethane prepolymers is between 1.2 and 1.8.

* * * * *